United States Patent [19]
Lokhoff et al.

[11] Patent Number: 5,606,618
[45] Date of Patent: *Feb. 25, 1997

[54] SUBBAND CODED DIGITAL TRANSMISSION SYSTEM USING SOME COMPOSITE SIGNALS

[75] Inventors: Gerardus C. P. Lokhoff, Eindhoven, Netherlands; Y. F. Dehery, Cedex, France; G. Stoll; G. Theile, both of Munich, Germany

[73] Assignee: U.S. Philips Corporation, New York, N.Y.

[*] Notice: The term of this patent shall not extend beyond the expiration date of Pat. No. 5,539,829.

[21] Appl. No.: 173,850

[22] Filed: Dec. 27, 1993

Related U.S. Application Data

[63] Continuation of Ser. No. 997,158, Dec. 21, 1992, Pat. No. 5,323,396, which is a continuation of Ser. No. 532,462, Jun. 1, 1990, abandoned.

[30] Foreign Application Priority Data

Jun. 2, 1989 [NL] Netherlands ............................ 8901402
Feb. 13, 1990 [NL] Netherlands ............................ 9000338

[51] Int. Cl.$^6$ ................................ H04H 5/00; G10L 1/06
[52] U.S. Cl. ........................ 381/2; 395/2.38; 395/2.12; 395/2.14
[58] Field of Search ................................ 381/22, 23, 1, 381/2; 395/2.12, 2.14, 2.38

[56] References Cited

U.S. PATENT DOCUMENTS

| | | | |
|---|---|---|---|
| 3,624,298 | 3/1969 | Davis | 381/98 |
| 4,464,782 | 8/1984 | Beraud et al. | 381/31 |
| 4,622,689 | 11/1986 | Hobrough | 381/27 |
| 4,680,796 | 7/1987 | Blackmer et al. | 381/23 |
| 4,866,774 | 9/1989 | Klayman | 381/1 |
| 4,896,362 | 1/1990 | Veldhuis et al. | 381/30 |
| 4,899,384 | 2/1990 | Crouse et al. | 381/31 |
| 4,941,177 | 7/1990 | Mandell et al. | 381/22 |
| 5,067,157 | 11/1991 | Ishida et al. | 381/1 |
| 5,109,417 | 4/1992 | Fielder et al. | 381/36 |
| 5,142,656 | 8/1992 | Fielder et al. | 381/37 |
| 5,222,189 | 6/1993 | Fielder | 395/2 |
| 5,341,457 | 8/1994 | Hall, II et al. | 381/1 |

FOREIGN PATENT DOCUMENTS 9212607 7/1992 WIPO.

OTHER PUBLICATIONS

"The Critical Band Coder—Digital Encoding of Speech Signals Based on the Perceptual Requirements of the Auditory System" by Michael A. Krasner, IEEE, 1980, pp. 327–331.

"Low bit-rate coding of high-quality audio signals—An introduction to the MASCAM system" by G. Theile, G. Stoll and M. Link; EBU Review—Technical, No. 230 (Aug. 1988), pp. 71–94.

*Primary Examiner*—Forester W. Isen
*Attorney, Agent, or Firm*—David R. Treacy

[57] ABSTRACT

Reproduction accuracy of, for example a digital stereo audio signal, is improved by transmitting sample data as sub-signals such as frequency subband signals. In one or more subbands, corresponding components such as left and right stereo channels are combined so that only one composite signal is transmitted per subband. An indicator signal is transmitted, indicating which subbands are combined. Scale factor signals for all subbands, and for the relative intensity of the respective subband signals which were combined, may also be transmitted. In the receiver a subband signal is derived for each channel from the composite signal, before synthesis of the full channel signals which will be reproduced.

6 Claims, 11 Drawing Sheets

| BR bitrate (kbits/s) | Fs sample freq. (kHz) | B # slots in a frame |
|---|---|---|
| 128 | 32<br>44.1<br>48 | 48<br>34 + padding<br>32 |
| 192 | 32<br>44.1<br>48 | 72<br>52 + padding<br>48 |
| 256 | 32<br>44.1<br>48 | 96<br>69 + padding<br>64 |
| 384 | 32<br>44.1<br>48 | 144<br>104 + padding<br>96 |

FIG. 5

| bitrate (kbits/s) | total # frames in padding sequence | # frames with a dummy slot |
|---|---|---|
| 128 | 147 | 122 |
| 192 | 49 | 12 |
| 256 | 147 | 97 |
| 384 | 49 | 24 |

FIG. 6

Bit 24 :           Frame type           0     format A
                                        1     format B Bits 25 and 26:    Copyright            0 0   no copyright, own rec.
                                        0 1   no copyright, software
                                        1 0   copyright, own recording
                                        1 1   copyright, software Bits 27 - 31 :     Mode indication

|   |   |   |   |   |         | Sample Freq. | Emphasis |
|---|---|---|---|---|---------|--------------|----------|
| 0 | 0 | 0 | 0 | 0 | Stereo  | 48    kHz    | no emphasis |
| 0 | 0 | 0 | 0 | 1 | Stereo  | 48    kHz    | 50/15 μsec |
| 0 | 0 | 0 | 1 | 0 | Stereo  | 44.1  kHz    | no emphasis |
| 0 | 0 | 0 | 1 | 1 | Stereo  | 44.1  kHz    | 50/15 μsec |
| 0 | 0 | 1 | 0 | 0 | Stereo  | 32    kHz    | no emphasis |
| 0 | 0 | 1 | 0 | 1 | Stereo  | 32    kHz    | 50/15 μsec |
| 0 | 0 | 1 | 1 | 0 |         | reserved     |  |
| 0 | 0 | 1 | 1 | 1 |         | reserved     |  |
| 0 | 1 | 0 | 0 | 0 | 2 Chan. | 48    kHz    | no emphasis |
| 0 | 1 | 0 | 0 | 1 | 2 Chan. | 48    kHz    | 50/15 μsec |
| 0 | 1 | 0 | 1 | 0 | 2 Chan. | 44.1  kHz    | no emphasis |
| 0 | 1 | 0 | 1 | 1 | 2 Chan. | 44.1  kHz    | 50/15 μsec |
| 0 | 1 | 1 | 0 | 0 | 2 Chan. | 32    kHz    | no emphasis |
| 0 | 1 | 1 | 0 | 1 | 2 Chan. | 32    kHz    | 50/15 μsec |
| 0 | 1 | 1 | 1 | 0 |         | reserved     |  |
| 0 | 1 | 1 | 1 | 1 |         | reserved     |  |
| 1 | 0 | 0 | 0 | 0 | 1 Chan. | 48    kHz    | no emphasis |
| 1 | 0 | 0 | 0 | 1 | 1 Chan. | 48    kHz    | 50/15 μsec |
| 1 | 0 | 0 | 1 | 0 | 1 Chan. | 44.1  kHz    | no emphasis |
| 1 | 0 | 0 | 1 | 1 | 1 Chan. | 44.1  kHz    | 50/15 μsec |
| 1 | 0 | 1 | 0 | 0 | 1 Chan. | 32    kHz    | no emphasis |
| 1 | 0 | 1 | 0 | 1 | 1 Chan. | 32    kHz    | 50/15 μsec |
| 1 | 0 | 1 | 1 | 0 |         | reserved     |  |
| 1 | 0 | 1 | 1 | 1 | 1 Chan. | 48    kHz    | CCITT J.17 |
| 1 | 1 | 0 | 0 | 0 | Stereo  | 48    kHz    | CCITT J.17 |
| 1 | 1 | 0 | 0 | 1 | 2 Chan. | 48    kHz    | CCITT J.17 |
| 1 | 1 | 0 | 1 | 0 | Stereo  | 44.1  kHz    | CCITT J.17 |
| 1 | 1 | 0 | 1 | 1 | 2 Chan. | 44.1  kHz    | CCITT J.17 |
| 1 | 1 | 1 | 0 | 0 | Stereo  | 32    kHz    | CCITT J.17 |
| 1 | 1 | 1 | 0 | 1 | 2 Chan. | 32    kHz    | CCITT J.17 |
| 1 | 1 | 1 | 1 | 0 | 1 Chan. | 32    kHz    | CCITT J.17 |
| 1 | 1 | 1 | 1 | 1 | 1 Chan. | 44.1  kHz    | CCITT J.17 |

FIG. 7

| mode | channel I | channel II |
|------|-----------|------------|
| stereo | left | right |
| 2 channel mono | program I | program II |
| 1 channel mono | program I | not used |

FIG. 8

```
allocation      length of samples
info            in bits

0000            -           (no samples or scale factors transferred)
0001            2
0010            3
0011            4
0100            5
0101            6
0110            7
0111            8
1000            9
1001            10
1010            11
1011            12
1100            13
1101            14
1110            15
1111                        not used to prevent incorrect sync detection
```

FIG. 9

```
slot 2:
I-1     II-1    I-2     II-2    I-3     II-3    I-4     II-4
slot 3:
I-5     II-5    I-6     II-6    I-7     II-7    I-8     II-8
slot 4:
I-9     II-9    I-10    II-10   I-11    II-11   I-12    II-12
slot 5:
I-13    II-13   I-14    II-14   I-15    II-15   I-16    II-16
slot 6:
I-17    II-17   I-18    II-18   I-19    II-19   I-20    II-20
slot 7:
I-21    II-21   I-22    II-22   I-23    II-23   I-24    II-24
slot 8:
I-25    II-25   I-26    II-26   I-27    II-27   I-28    II-28
slot 9:
I-29    II-29   I-30    II-30   I-31    II-31   I-32    II-32
```

FIG. 10

```
slot 2:
I-1     II-1    I-2     II-2    I-3     II-3    I-4     II-4
slot 3:
I-5     II-5    I-6     II-6    I-7     II-7    I-8     II-8
slot 4:
I-9     II-9    I-10    II-10   I-11    II-11   I-12    II-12
slot 5:
I-13    II-13   I-14    II-14   I-15    II-15   I-16    II-16
```

FIG. 11

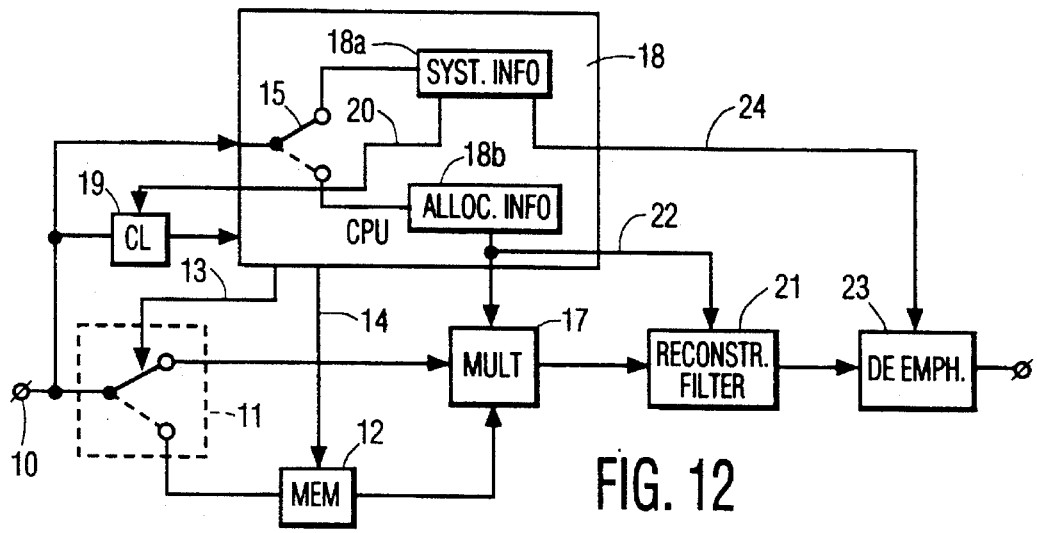
FIG. 12
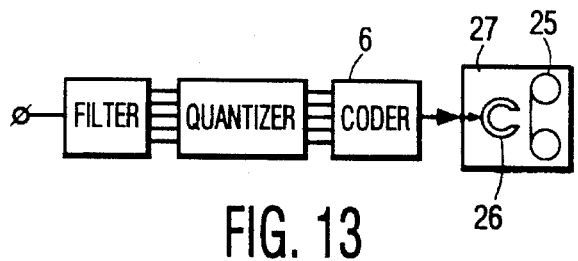
FIG. 13
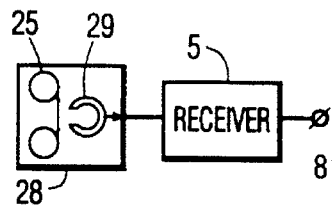
FIG. 14
FIG. 15a
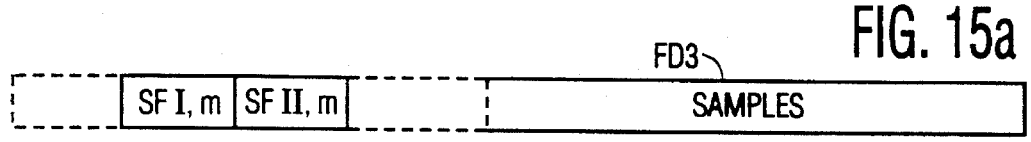
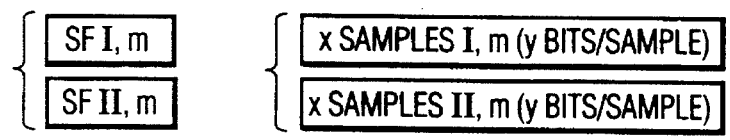
FIG. 15b
FIG. 15c
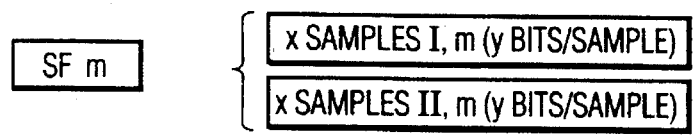
FIG. 15d Bits 16 to 19 : bitrate index

| bitrate (kbits/sec.) | BR index | sample frequency Fs 48 kHz # slots | 44.1 kHz # slots | 32 kHz # slots |
|---|---|---|---|---|
| 32  | 1  | 8   | 8   | 12  |
| 64  | 2  | 16  | 17  | 24  |
| 96  | 3  | 24  | 26  | 36  |
| 128 | 4  | 32  | 34  | 48  |
| 160 | 5  | 40  | 43  | 60  |
| 192 | 6  | 48  | 52  | 72  |
| 224 | 7  | 56  | 60  | 84  |
| 256 | 8  | 64  | 69  | 96  |
| 288 | 9  | 72  | 78  | 108 |
| 320 | 10 | 80  | 87  | 120 |
| 352 | 11 | 88  | 95  | 132 |
| 384 | 12 | 96  | 104 | 144 |
| 416 | 13 | 104 | 113 | 156 |
| 448 | 14 | 112 | 121 | 168 |

+ padding

Bits 20 and 21 : Sample Frequency

```
0 0    44.1 kHz
0 1    48   kHz
1 0    32   kHz
1 1    reserved
```

Bit 22 : padding bit

'1' if the frame contains a 'dummy' slot, Otherwise '0'

Bit 23 : Future Use     reserved for future use,
                        '0' for the time being.

| $b_{24}$ MODE | SWITCH | C | O/H | EMPH $b_{31}$ |

FIG.19

Bits 24 and 25 : Mode indication 0 0    stereo
    0 1    intensity stereo
    1 0    bilingual
    1 1    mono Bits 26 and 27 : Intensity stereo mode switches :

0 0    subbands  5 - 32  in intensity stereo mode
  0 1    subbands  9 - 32  in intensity stereo mode
  1 0    subbands 13 - 32  in intensity stereo mode
  1 1    subbands 17 - 32  in intensity stereo mode Bit 28 : Copyright    0    no copyright
                    1    copyright protected Bit 29 : Original/Home Copy    0    Copy
                            1    Original Bits 30 and 31 : Emphasis    0 0    no emphasis
                            0 1    50/15 $\mu$sec emphasis
                            1 0    reserved
                            1 1    CCITT J.17

FIG.20

Mono mode :

M = mono signal slot 2:
    M-1  M-2  M-3  M-4  M-5  M-6  M-7  M-8
slot 3:
    M-9  M-10  M-11  M-12  M-13  M-14  M-15  M-16
slot 4:
    M-17  M-18  M-19  M-20  M-21  M-22  M-23  M-24
slot 5:
    M-25  M-26  M-27  M-28  M-29  M-30  M-31  M-32

FIG.21

Intensity Stereo mode :

L = left channel, R = right channel, M = mono signal

Switch bits (bits 26 and 27) are 0 0 :

```
slot 2:
      L-1   R-1   L-2   R-2   L-3   R-3   L-4   R-4
slot 3:
      M-5   M-6   M-7   M-8   M-9   M-10  M-11  M-12
slot 4:
      M-13  M-14  M-15  M-16  M-17  M-18  M-19  M-20
slot 5:
      M-21  M-22  M-23  M-24  M-25  M-26  M-27  M-28
slot 6:
      M-29  M-30  M-31  M-32
```

FIG. 22a

Switch bits are 0 1 :

```
slot 2:
      L-1   R-1   L-2   R-2   L-3   R-3   L-4   R-4
slot 3:
      L-5   R-5   L-6   R-6   L-7   R-7   L-8   R-8
slot 4:
      M-9   M-10  M-11  M-12  M-13  M-14  M-15  M-16
slot 5:
      M-17  M-18  M-19  M-20  M-21  M-22  M-23  M-24
slot 6:
      M-25  M-26  M-27  M-28  M-29  M-30  M-31  M-32
```

FIG. 22b

Switch bits are 1 0 :

```
slot 2:
      L-1   R-1   L-2   R-2   L-3   R-3   L-4   R-4
slot 3:
      L-5   R-5   L-6   R-6   L-7   R-7   L-8   R-8
slot 4:
      L-9   R-9   L-10  R-10  L-11  R-11  L-12  R-12
slot 5:
      M-13  M-14  M-15  M-16  M-17  M-18  M-19  M-20
slot 6:
      M-21  M-22  M-23  M-24  M-25  M-26  M-27  M-28
slot 7:
      M-29  M-30  M-31  M-32
```

FIG. 22c

Switch bits are 1 1 :

```
slot 2:
      L-1   R-1   L-2   R-2   L-3   R-3   L-4   R-4
slot 3:
      L-5   R-5   L-6   R-6   L-7   R-7   L-8   R-8
slot 4:
      L-9   R-9   L-10  R-10  L-11  R-11  L-12  R-12
slot 5:
      L-13  R-13  L-14  R-14  L-15  R-15  L-16  R-16
slot 6:
      M-17  M-18  M-19  M-20  M-21  M-22  M-23  M-24
slot 7:
      M-25  M-26  M-27  M-28  M-29  M-30  M-31  M-32
```

FIG. 22d

|   s'   |   s'   | TRUNCATED |        |
|--------|--------|-----------|--------|
| +1     | 0.75   | 011       | 110    |
| 0.71   | 0.50   | 010       | 101    |
| 0.42   | 0.25   | 001       | 100    |
| 0.14   | 0      | 000       | 011    |
| -0.14  | -0.25  | 111       | 010    |
| -0.42  | -0.50  | 110       | 001    |
| -0.71  | -0.75  | 101       | 000    |
| -1     | -1     | 100       |        |
| (a)    | (b)    | (c)       | (d)    |

FIG. 25

|     |     | s'    |         | s'    |
|-----|-----|-------|---------|-------|
| 110 | 010 | 0.50  | 0.857   | +1    |
| 101 | 001 | 0.25  | 0.571   | 0.71  |
| 100 | 000 | 0.00  | 0.287   | 0.42  |
| 011 | 111 | -0.25 | 0.00    | 0.14  |
| 010 | 110 | -0.50 | -0.287  | -0.14 |
| 001 | 101 | -0.75 | -0.571  | -0.42 |
| 000 | 100 | -1.00 | -0.857  | -0.71 |
| (a) | (b) | (c)   |         | (d)   |

FIG. 26

SUBBAND CODED DIGITAL TRANSMISSION SYSTEM USING SOME COMPOSITE SIGNALS

This application is a continuation of U.S. patent application Ser. No. 07/997,158 filed Dec. 21, 1992 now U.S Pat. No. 5,32,396, which is a continuation of application Ser. No. 07/532,462 filed on Jun. 1, 1990 by Gerardus C. P. Lokhoff for DIGITAL TRANSMISSION SYSTEM, TRANSMITTER AND RECEIVER FOR USE IN THE TRANSMISSION SYSTEM, AND RECORD CARRIER OBTAINED BY MEANS OF THE TRANSMITTER IN THE FORM OF A RECORDING DEVICE, now abandoned.

BACKGROUND OF THE INVENTION

1. Field of the Invention

The invention relates to a transmission system for producing a replica of a wideband digital signal which includes at least a first and a second component; and more particularly to such a system which comprises an encoder including an analyzer for altering the digital signal to obtain a number n of sub-signals for said digital signal; a transmitter for transmitting the sub-signals for reception at a different time or place; a receiver for receiving the sub-signals; and a decoder including a synthesizer for combining the received sub-signals to obtain respective replicas of the digital signal. The invention also relates to an encoding transmitter, and a decoding receiver for such a system.

2. Description of the Prior Art

One transmission system of this type is known from an article, "The Critical Band Coder—Digital Encoding of Speech Signals Based on the Perceptual Requirement of the Auditory System" by M. E. Krasner, published in Proc. IEEE ICASSP 80, Vol. 1, pp 327–331, Apr. 9–11, 1980. This article relates to a transmission system in which the sub-signals are signals representing frequency bands. The transmitter includes a frequency subband coding system in which the speech signal band is divided into a plurality of subbands whose bandwidths approximate the bandwidths of the critical bands of the human ear in the respective frequency ranges (see FIG. 2 of this article). This division is selected because, based on psycho-acoustic experiments, one can expect that quantization noise in such a subband will be masked to an optimum extent by the signals in that subband, if during quantization allowance is made for the noise-masking curve of the human ear. Threshold values for noise masking by single tones are shown in FIG. 3 of this article. The receiver employs a corresponding subband decoding system.

When applying frequency subband coding to a high-quality digital music signal, such as one according to the Compact Disc Standard which uses 16 bits per signal sample at a sample frequency of 1/T=44.1 kHz, with a suitably selected bandwidth and a suitable selected quantization for the respective subbbands, the quantized output signals of the coder can be represented by an average number of approximately 2.5 bits per signal sample. The quality of the replica of the music signal does not differ perceptibly from that of the original music signal in substantially all passages of substantially all kinds of music signals.

The subbands need not necessarily correspond to the bandwidths of the critical bands of the human ear. For example, the subbands may have equal bandwidths, provided that allowance is made for this in determining the masking threshold.

The invention is also applicable to other types of transmission systems, such as those in which blocks of samples are transform coded. Such systems are referred to in the article "Low bit-rate coding of high-quality audio signals. An introduction to the MASCAM system" by G. Thiele, G. Stoll and M. Link, published in EBU Technical Review, no. 230, pp. 71–94, August 1988. In such a system the transform coefficients correspond to the sub-signals.

The sub-signal transmission systems described above have the disadvantage that, in some cases, perceptible differences occur between the replica and the signal which was to be transmitted. These differences are perceived as a form of distortion in the replica generated by the receiver. Often they are the result of the number of bits, available for quantization of certain of the sub-signals, being too low.

SUMMARY OF THE INVENTION

An object of the invention is to enable transmission of signals representing a wideband digital signal with a significant reduction of the distortion present in the replica generated in the receiver.

Another object of the invention is to identify sub-signals, corresponding to first and second signal components which are related to each other, which can be combined to obtain a composite signal which is transmitted in place of those sub-signals.

Another object of the invention is to transmit digital signals corresponding to stereo audio signals with reduced distortion in the generated replica.

According to the invention, a system as described above further comprises control circuitry for determining and optimizing bit allocation, and a signal combiner for combining selected corresponding sub-signals from the first and second components of the original digital signal to obtain one or more composite sub-signals, and an indicator generator for generating an indicator signal indicating that these corresponding sub-signals are combined. The receiver is responsive to the indicator signal, for generating a signal relating to that composite signal and related to at least one of said first and second components. Preferably, the receiver includes a decoder which synthesizes a signal which is the desired replica, by combining the transmitted sub-signals and composite sub-signals.

The invention is based on recognition that the numbers of bits made available for different sub-signals are not optimally allocated, so that quantization of certain sub-signals is too rough. This leads to audible distortion in a replica resulting from decoding of the received signal. By selectively combining subsignals which have a correspondence or relationship to each other, and quantizing only one composite sub-signal, so as to make more bits available for quantizing of those sub-signals which are transmitted, the reduced quantizing distortion may more than compensate for the slight loss of information in the replica. This is especially true when the sub-signals which are combined are signals corresponding to a same frequency subband, such as left and right stereo, or other spatial-differentiating signals, in music or audio transmission.

Alternatively, the composite signal may itself be quantized with a greater number of bits than if the two sub-signals were quantized separately.

In a preferred embodiment, a control or central processing unit, and an allocation control unit, together functioning as control or steering circuits, control the signal combiner to combine, in each of a number $m_1$ of said subbands, the subband signals of the first and second components in those subbands, to obtain $m_1$ composite signals in said $m_1$ subbands, where $m_1$ is greater than 1. The signal generator generates an indicator signal identifying which subbands had their corresponding sub-signals combined. This indicator signal will function as a steering control signal. The transmitter transmits these composite signals in the $m_1$ subbands, the indicator signal, and the remaining sub-signals which have not been combined. In this embodiment, the receiver decoder has a deriving circuit for deriving $m_1$ subband signals from the composite signals in the $m_1$ subbands, and combining these with the subband signals which were transmitted.

A variation of this embodiment allows a still greater reduction of the data. An allocation control circuit in the transmitter determines the bit availability after the $m_1$ subbands have been processed to form the composite sub-signals. If bit availability is still such that quantization of some subbands will be too rough, then a second evaluation is made with a greater number of subbands being combined. For example, in each of a number $m_2$ subbands the subband signals of said signal components are combined to obtain $m_2$ composite signals in said $m_2$ subbands. The value $m_2$ will be greater than $m_1$, and will preferably include all of the $m_1$ subbands.

In this embodiment the signal generator will then generate a different indicator signal, identifying the $m_2$ subbands, and the transmitter transmits these composite signals in the $m_2$ subbands. In the receiver the deriving circuit derives first the $m_2$ composite signals in the $m_2$ subbands from the signal received, and then derives from these $m_2$ composite signals, in response to the indicator signal, subband signals in the $m_2$ subbands corresponding to said signal portions.

In a typical audio subband division, the $m_1$ subbands are the $m_1$ highest subbands; and if further combining is required, then the $m_2$ subbands are the $m_2$ highest subbands. This method of combining takes advantage of the fact that the human ear is less phase sensitive in those frequency bands. In one embodiment discussed more fully below, the value $m_1$ is half of the number M of subbands. For example, if M=32, the highest (highest frequency) 16 bands may initially be selected for combining. A value of 20 may be used for $m_2$, and the process can be repeated for $m_3$=24 and $m_4$=28.

In yet another preferred embodiment, the transmitter comprises a scale factor determiner, for determining a scale factor for time equivalent signal blocks of the first and second components in the subband signals; and the transmitting section transmits these scale factors. The detector in the receiver is adapted to detect the scale factors which have been transmitted, and to control a multiplier for the subband signals before the full bandwidth signal is reconstructed in a synthesis filter. Correction for any pre-emphasis is made after reconstruction.

BRIEF DESCRIPTION OF THE DRAWING

FIG. 5 is a table showing the number of information packets B in a frame, for certain values of bit rate BR and sample frequency $F_s$, FIG. 6 is a table showing the numbers of frames in a padding sequence for different bit rates, FIG. 7 is a table showing the system information included in the first portion of a frame, FIG. 8 is a table showing a distribution of information between channels for diffferent modes, FIG. 9 is a table of meanings of allocation information inserted in the second portion of a frame, FIGS. 10 and 11 are tables showing sequences in which allocation information is stored for two different formats, FIG. 12 is a block diagram of a receiver according to the invention, FIG. 13 is a simplified block diagram of a transmitter which records the second digital signal on a magnetic record carrier, FIG. 14 is a simplified block diagram of a receiver for producing a replica signal from the magnetic record carrier of FIG. 13, FIGS. 15a–15d are diagrams of different arrangements of scale factors and samples in the third portion of a frame, FIG. 19 is a diagram of a structure for a portion of the structure of FIG. 17, FIG. 20 is a table showing bit codings in an embodiment of the structure of FIG. 19, FIG. 21 is a table showing a sequence for allocation information accommodated in a second frame portion associated with the first portion of FIG. 17, for a monaural mode, FIGS. 22a–d are tables showing sequences for allocation information accommodated in a second frame portion associated with the first portion of FIG. 17, for a stereo intensity mode, FIG. 25 is a table showing quantization of scaled samples to form q-bit digital representations, and FIG. 26 is a table showing dequantization of the q-bit digital representations.

DESCRIPTION OF THE PREFERRED EMBODIMENTS

Figure 1A:
FIG. 1 is a diagram of a second digital signal generated by a transmitter according to the invention, organized as frames each composed of information packets.
Figure 1B:
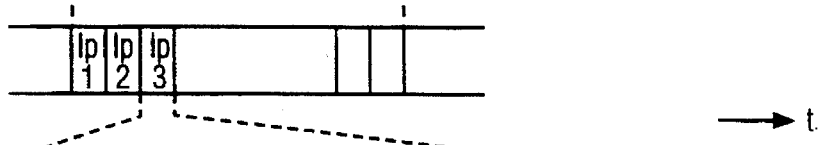
Figure 1C:
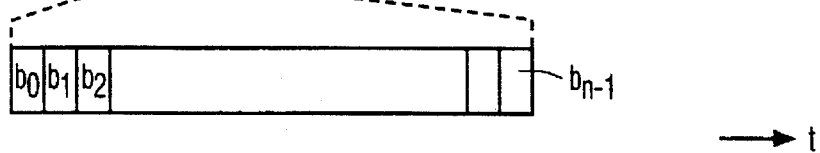

FIG. 1 shows diagrammatically the second digital signal as generated by the transmitter and transmitted via the transmission medium. The second digital signal takes the form of the serial digital data stream. The second digital signal comprises frames, two such frames, i.e. the frame j and the frame j+1, being given in FIG. 1a. The frames, such as the frame j, comprise a plurality of information packets IP1, IP2, IP3, . . . , see FIG. 1b. Each information packet, such as IP3, comprises N bits $b_0, b_1, b_2, \ldots, b_{N-1}$, see FIG. 1c.

Number of Packets

The number of information packets in a frame depends upon (a) the bit rate BR with which the second digital signal is transmitted through the transmission medium, (b) the number of bits N in an information packet, N being larger than 1, (c) the sample frequency $F_s$ of the wide-band digital signal, and (d) the number of samples $n_s$ of the wide-band digital signal.

The information which corresponds to these packets, and which after conversion in the transmitter belongs to the second digital signal, is included in one frame in the following manner. The parameter P is computed in conformity with the formula $$P = \frac{BR}{N} \times \frac{n_s}{F_s} .$$

If this computation yields an integer for P the number of information packets B in a frame will be equal to P. If the computation does not result in an integer some frames will comprise P' information packets and the other frames will comprise P'+1 information packets. P' is the next lower integer following P. The number of frames comprising P' and P'+1 information packets is selected in such a way that the average frame rate is equal to $F_s/n_s$.

Hereinafter it is assumed that N=32 and $n_s$=384. The table in FIG. 5 gives the number of information packets (slots) in one frame for these values for N and $n_s$ and for four values of the bit rate BR and three values for the sample frequency $F_s$. It is evident that for a sample frequency $F_s$ equal to 44.1 kHz the parameter P is not an integer in all cases and that consequently a number of frames comprise 34 information packets and the other frames comprise 35 information packets (when BR is 128 kbit/s). This is also illustrated in FIG. 2.

Figure 2:
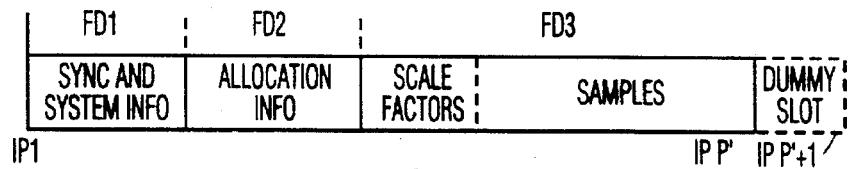
FIG. 2 is a diagram of the structure of a frame according to a preferred embodiment including scale factors.

FIG. 2 shows one frame. The frame comprises P' information packets IP1, IP2, . . . , IP P' Sometimes the frame comprises P'+1 information packets. This is achieved by assigning an additional information packet (dummy slot) to the frames of P' information packets. The second column of the table of FIG. 6 gives the number of frames in the padding sequence for a sample frequency of 44.1 kHz and the aforementioned four bit rates. The third column specifies those frames of that number of frames in the sequence which comprise P'+1 information packets. By subtracting the numbers in the second and the third column from each other this yields the number of frames in the sequence comprising P' information packets. The (P'+1)th information packet then need not contain any information, and may then comprise for example only zeroes.

It is obvious that the bit rate BR is not necessarily limited to the four values as given in the tables of FIGS. 5 and 6. Other (for example intermediate) values are also possible.

FIG. 2 shows that a frame comprises three frame portions FD1, FD2 and FD3 in this order. The first frame portion FD1 contains synchronising information and system information. The second frame portion FD2 contains allocation information. The third frame portion FD3 contains samples and, when applicable, scale factors of the second digital signal. For a further explanation it is necessary to first describe the operation of the transmitter in the transmission system in accordance with the invention.

The Transmission System

Figure 4:
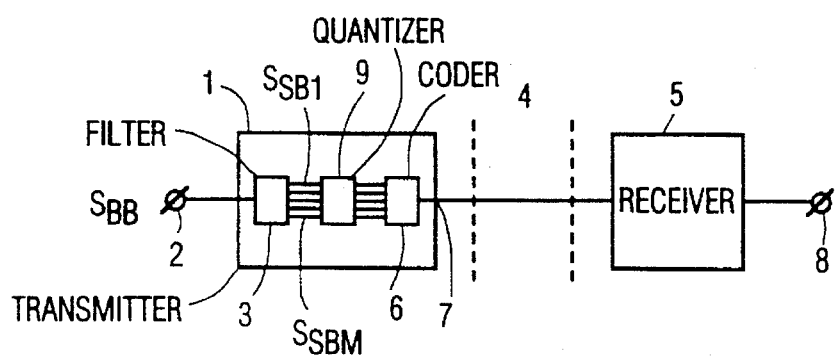
FIG. 4 is a block diagram of a system according to the invention

FIG. 4 shows diagrammatically the transmission system comprising a transmitter 1 having an input terminal 2 for receiving the wide-band digital signal $S_{BB}$, which may be for example a digital audio signal. In the case of an audio signal, this may be a mono signal or a stereo signal, in which case the digital signal comprises a first (left channel) and a second (right channel) signal component. It is assumed that the transmitter comprises a coder for subband coding of the wide-band digital signal and that the receiver consequently comprises a subband decoder for recovering the wide-band digital signal.

The transmitter comprises an analysis filter 3 responsive to the digital wide-band signal $S_{BB}$ to divide the wide band into a plurality M of successive frequency subbands having band numbers m, where $1 \leq m \leq M$, which increase with frequency. All these subbands may have the same bandwidth but, alternatively, the subbands may have different bandwidths. In that case the subbands may correspond, for example, to the bandwidths of the critical bands of the human ear. The analysis filter generates subband signals $S_{SB1}$ to $S_{SBM}$, for the respective subbands. The transmitter further comprises circuits for sample frequency reduction and block-by-block quantization of the respective subband signals, shown as the block 9 in FIG. 4.

Such a subband coder is known and is described, for example, in the aforementioned publications by Krasner and by Thelie et al. Reference is also made to the published European Patent Application 289,080, to which U.S. Pat. No. 4,896,362 corresponds.

For a further description of the operation of the subband coder reference is made to these publications, which are therefore incorporated herein by reference. Such a subband coder enables a significant data reduction to be achieved in the signal which is transmitted to the receiver 5 through the transmission medium 4, for example a reduction from 16 bits per sample for the wide-band digital signal $S_{BB}$ to 4 bits per sample if $n_s$ is 384. This means that there are blocks of 384 samples of the wide-band digital signal, each sample having a length of 16 bits. If a value M=32 is assumed, the wide-band digital signal is split into 32 subband signals in the analysis filter means 3. Now 32 (blocks of) subband signals appear on the 32 outputs of the analysis filter means, each block comprising 9 samples, where 9=12, (the subbands have equal width) and each sample having a length of 16 bits. This means that on the outputs of the filter means 3 the information content is still equal to the information content of the block of 384 samples of the signal $S_{BB}$ on the input 2.

The data reduction circuit 9 operates on the output of the filter 3 using the knowledge about masking. At least some of the samples in the 32 blocks of 12 samples, each block for one subband, are quantized more roughly and can thus be represented by a smaller number of bits. In the case of a static bit allocation all the samples per subband per frame are expressed in a fixed number of bits. This number can be different for two or more subbands but it can also be equal for the subbands, for example equal to 4 bits. In the case of dynamic bit allocation the number of bits selected for every subband may differ viewed in time, so that sometimes even a larger data reduction can be achieved, or a higher quality with the same bit rate.

The subband signals quantized in the block 9 are applied to a generator unit 6. Starting from the quantized subband signals this unit 6 generates the second digital signal as illustrated in FIGS. 1 and 2. This second digital signal, as stated hereinbefore, can be transmitted directly through the medium 4. Preferably, however, this second digital signal is first adapted in a signal converter (not shown), such as an 8-to-10converter. Such an 8-to-10 converter is described in, for example, European Patent Application 150,082 to which U.S. Pat. No. 4,620,311 corresponds. This converter converts 8-bit data words into 10-bit data words, and enables an interleaving process to be applied. De-interleaving, error correction and 10-to-8 conversion are then performed in the receiver.

Frame Format

Figure 3:
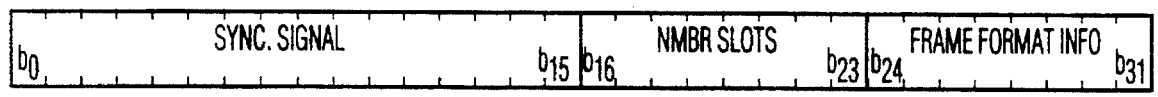
FIG. 3 is a diagram of the structure of the first portion of the frame of FIG. 2.

The composition and content of the frames will now be explained in more detail. The first frame portion FD1 in FIG. 2 is shown in greater detail in FIG. 3. FIG. 3 shows that the first frame portion comprises exactly 32 bits and is therefore exactly equal to one information packet, namely the first information packet IP1 of the frame. The first 16 bits of the information packet form the synchronising signal (or synchronising word), and may comprise for example only "ones". The bits 16 to 31 are system information. The bits 16 to 23 represent the number of information packets in a frame. This number consequently corresponds to P', both for the frame comprising P' information packets and for frames comprising the additional information packet IP P'+1. P' can be at the most 254 (1111 1110 in bit notation) in order to avoid resemblance to the synchronising signal. The bits 24 to 31 provide frame format information.

FIG. 7 gives an example of the arrangement and significance of this information. Bit 24 indicates the type of frame. In the case of format A the second frame portion has another length (a different number of information packets) than in the case of format B. As will become apparent hereinafter, the second frame portion FD2 in the A format comprises 8 information packets, namely the information packets IP2 to IP9 inclusive; and in the B format it comprises 4 information packets, namely the information packets IP2 to IP5 inclusive. The bits 25 and 26 indicate whether copying of the information is allowed. The bits 27 to 31 indicate the function mode. This means:

a) the channel mode, which indicates the type of wide-band signal (as stated hereinbefore this may be a stereo audio signal, a mono audio signal, or an audio signal comprising two different signal components for example representing the same text but in two different languages). FIG. 8 represents the channel mode. It illustrates how the signal components are divided between the two channels (channel I and channel II) in the aforementioned cases.

b) the sample frequency $F_s$ of the wide-band signal.

c) the emphasis which may be applied to the wide-band digital signal in the transmitter. The values 50 and 15 μs are the time constants of the emphasis and CCITT J. The value 17 indicates a specific emphasis standard as defined by the CCITT (Comité Consultative Internationale de Télégraphie et Téléphonie).

The content of the frame portion FD2 in FIG. 2 will be described in more detail with reference to FIGS. 9, 10 and 11. In the A format the second frame portion contains eight information packets. This is based on the assumptions that the wide-band digital signal $S_{BB}$ is converted into 32 subband signals (for every signal portion of the digital signal $S_{BB}$), and that an allocation word having a length of four bits is assigned to every subband. This yields a total of 64 allocation words having a length of 4 bits each, which can be accommodated exactly in eight information packets. In the B format the second frame portion accommodates the allocation information for only half the number of subbands, so that now the second frame portion comprises only 4 information packets.

FIG. 9 illustrates the significance of the four-bit allocation words AW. An allocation word associated with a specific subband specifies the number of bits by which the samples of the subband signal in the relevant subband are represented after quantization in the unit 9. For example, the allocation word AW which is 0100 indicates that the samples are represented by 5-bit words. Moreover, it follows from FIG. 9 that the allocation word 0000 indicates that no samples have been generated in the relevant subband. This may happen, for example, if the subband signal in an adjacent subband has such a large amplitude that this signal fully masks the subband signal in the relevant subband. The allocation word 1111 is not used because it closely resembles the sync word in the first information packet IP1.

FIG. 10 indicates the sequence, in the case that the frame mode is A, in which the allocation words AW, j,m associated with the two channels j, where j=I or II, and the 32 subbands of the sequence number m, m ranging from 1 to 32, are arranged in the second frame portion. The allocation word AWI,1 belonging to the first subband signal component of the first and lowest subband (channel I, subband 1) is inserted first. After this the allocation word AWII,1 belonging to the second subband-signal component of the first and lowest subband (channel II, subband 1) is inserted in the second frame portion FD2. Subsequently, the allocation word AWI,2 belonging to the first subband-signal component of the second and lowest but one subband (channel I, subband 2) is inserted in the frame portion FD2. This is followed by the allocation word AW ll,2 belonging to the second subband-signal component of the second subband (channel II, subband 2). This sequence continues until the allocation word AW II, 4 belonging to the second subband-signal component of the fourth subband (channel II, subband 4) is inserted in the second frame portion FD2. The second information packet IP2 (slot 2) of the frame, which is the first information packet in the frame portion FD2 of the frame, is then filled exactly. Subsequently, the information packet IP3 (slot 3) is filled with AWI,5; AWII,5; . . . AWII,8. This continues in the sequence as illustrated in FIG. 10.

FIG. 10 merely gives the indices j-m of the inserted allocation word AW, j,m. FIG. 11 indicates the sequence for the allocation words in the case of a B-format frame. In this case only allocation words of the subbands 1 to 16 are inserted. The sequence, as is illustrated in FIG. 10, corresponds to the sequence in which the separate samples belonging to a channel j and a subband m are applied to the synthesis filter means upon reception in the receiver. This will be explained in greater detail hereinafter.

The serial data stream contains for example only frames in conformity with the A format. In the receiver the allocation information in each frame is then employed for correctly deriving the samples from the information in the third frame portion of said frame. The serial data stream may also comprise, more or less alternately, both frames in conformity with the A format and frames in conformity with the B format. However, the frames in conformity with both formats may contain samples for all channels and all subbands in the third frame portion. A frame in conformity with the B format then lacks in fact the allocation information required to derive the samples for the channels I or II of the subbands 17 to 32 from the third frame portion of a B format frame.

The receiver comprises a memory in which the allocation information included in the second frame portion of an A format frame can be stored. If the next frame is a B format frame only the allocation information for the subbands 1 to 16 and the channels I and II in the memory is replaced by the allocation information included in the second frame portion of the B format frame. The samples for the subbands 17 to 32 from the third frame portion of the B format frame are derived from the allocation information for these subbands derived from the preceding A format frame and still present in the memory. The reason for the alternate use of A format frames and B format frames is that for some subbands the allocation information (in the present case the allocation information for the higher subbands 17 to 32) does not change rapidly. Since during quantization the allocation information for the various subbands is available in the transmitter, this transmitter can decide to generate a B format frame instead of an A format frame if the allocation information for the subbands 17 to 32 inclusive does not change (significantly). Moreover, this illustrates that now additional space becomes available for the inclusion of samples in the third frame portion FD3.

For a specific value of P' the third frame portion of a B format frame is four information packets longer than the third frame portion of an A format frame. This enables the number of bits by which the samples in the lower subbands 1 to 16 are represented to be increased, so that for these subbands a higher transmission accuracy can be achieved. Moreover, if it is required to quantize the lower subbands more accurately the transmitter can automatically opt for the generation of B format frames. This may then be at the expense of the accuracy with which the higher subbands are quantized.

The third frame portion FD3 in FIG. 2 contains the samples of the quantized subband-signal components for the two channels. If the allocation word 0000 is not present in the frame portion FD2 for any of the subband channels this means that in the present example twelve samples are inserted in the third frame portion FD3 for each of the 32 subbands and 2 channels. This means that there are 768 samples in total.

Scale Factors

In the transmitter the samples may be multiplied by a scale factor prior to their quantization. For each of the subbands and channels the amplitudes of the twelve samples are divided by the amplitude of that sample of the twelve samples which has the largest amplitude. In that case a scale factor should be transmitted for every subband and every channel in order to enable the inverse operation to be performed upon the samples at the receiving end. For this purpose the third frame portion then contains scale factors SF j,m, one for each of the quantized subband-signal components in the various subbands.

In the present example, scale factors are represented by 6-bit numbers, the most significant bit first, the values ranging from 000000 to 111110. The scale factors of the subbands to which these are allocated, i.e. whose allocation information is non-zero, are accommodated in the leading part of the frame portion FD3 before the samples. This means that the scale factors are transmitted before the transmission of the samples begins. As a result rapid decoding in the receiver 5 can be achieved without the necessity of storing all the samples in the receiver, as will become apparent hereinafter. A scale factor SF j,m can thus represent the value by which the samples of the signal in the j-th channel of the m-th subband have been multiplied. Conversely, the number one divided by this value may be stored as the scale factor so that at the receiving end it is not necessary to divide the scale factors before the samples are scaled up to the correct values.

For the frame format A the maximum number of scale factors is 64. If the allocation word AW j,m for a specific channel j and a specific subband m has the value 0000, which means that for this channel and this subband no samples are present in the frame portion FD3, it will not be necessary to include a scale factor for this channel and this subband. The number of scale factors is then smaller than 64. The sequence in which the scale factors SF j,m are inserted in the third frame portion FD3 is the same as that in which the allocation words have been inserted in the second frame portion. The sequence is therefore as follows:

SF I,1; SF II,1; SF I,2; SF II,2; SF I,3; SF II,3; ... SF I,32; SF II,32.

If it is not necessary to insert a scale factor the sequence will not be complete. The sequence may then be for example: ... SF I,4; SF I,5; SF II,5; SF II,6; ...

In this case the scale factors for the fourth subband of channel II and the sixth subband of channel I are not inserted. If the frame is a B format frame it may still be considered to insert scale factors in the third frame portion for all the subbands and all the channels. However, this is not the only option. In this case it would also be possible to insert scale factors in the third frame portion of the frame for the subbands 1 to 16 only. In the receiver this requires a memory in which all scale factors can be stored at the instant at which a previously arriving A format frame is received. Subsequently upon reception of the B format frame only the scale factors for the subbands 1 to 16 are replaced by the scale factors included in the B format frame. The scale factors of the previously received A format frame for the subbands 17 to 32 are then used in order to restore the samples for these subbands included in the third frame portion of the B format frame to the correct scale.

The samples are inserted in the third frame portion FD3 in the same sequence as the allocation words and the scale factors, one sample for every subband of every channel in succession. According to this sequence, first all the first samples for the quantized subband signals for all the subbands of both channels are inserted, then all the second samples, ... etc. The binary representation of the samples is arbitrary, the binary word comprising only "ones" preferably not being used again.

The second digital signal generated by the transmitter 1 is subsequently applied to the transmission medium 4 by the output 7, and by means of the transmission medium 4 this signal is transferred to the receiver 5. Transmission through the transmission medium 4 may be a wireless transmission, such as for example a radio transmission channel. Many other transmission media are also possible. In this respect optical transmission may be envisaged, for example over optical fibres or optical record carriers, such as Compact-Disc-like media, or transmission by means of magnetic record carriers utilizing RDAT or SDAT-like recording and reproducing technologies, for which reference is made to the book "The art of digital audio" by J. Watkinson, Focal Press, London 1988.

The Receiver

As shown in FIG. 4, the receiver 5 comprises a decoder, which decodes the signal encoded in the coder 6 of the transmitter 1 and converts it into a replica of the wide-band digital signal supplied to the output 8. The essential information in the incoming signal is contained in the scale factors and the samples. The remainder of the information in the second digital signal is merely required for a "correct bookkeeping", to allow a correct decoding. The receiver first derives the synchronising and system information from the frames. The decoding process is then repeated for every incoming frame.

FIG. 12 shows a more detailed version of the receiver 5 of FIG. 4. The coded signal (the second digital signal) is applied to a unit 11 through the terminal 10. For every frame, the unit 19 first detects the sync words situated in the first 16 bits of the first frame portion. Since the sync words of successive frames are each time spaced apart by an integral multiple of P' or P'+1 information packets, the sync words can be detected very accurately. Once the receiver is in synchronism the sync word can be detected in the unit 19. To accomplish this, a time window having, for example, a length of one information packet is opened after each occurrence of P' information packets, so that only that part of the incoming information is applied to the sync word detector in the unit 19. If the sync word is not detected the time window remains open for the duration of another information packet because the preceding frame may be a frame comprising P'+1 information packets. From these sync words a PLL in the unit 19 can derive a clock signal to control the central processing unit 18.

It is evident from the above that the receiver should know how many information packets are contained in one frame. For this purpose the switching means 15 are then in the upper position shown, to apply the system information to the processing unit 18. The system information can now be stored in a memory 18a of the processing unit 18. The information relating to the number of information packets in a frame can be applied to the unit 19 over a control-signal line 20, to open the time window at the correct instants for sync-word detection. When the system information is received the switch 15 is changed over to the lower position. The allocation information in the second frame portion of the frame can now be stored in the memory 18b.

If the allocation information in the incoming frame does not comprise an allocation word for all the subbands and channels this will have become apparent already from the detected system information. This may be for example the information indicating whether the frame is an A-format or a B-format frame. Thus, under the influence of the relevant information contained in the system information, the processing unit 18 will store the received allocation words at the correct location in the allocation memory 18b.

It is obvious that in the present example the allocation memory 18b comprises 64 storage positions. If no scale factors are transmitted, the elements bearing the reference numerals 11, 12 and 17 may be dispensed with, and the content of the third frame portion of a frame is applied directly by the connection 16 from the input 10 to a synthesis filter 21. The samples are applied to the filter 21 in the same sequence as the order in which the filter 21 processes the samples in order to reconstruct the wide-band signal. The allocation information stored in the memory 18b is required in order to divide the serial data stream of samples into individual samples in the filter 21, each sample having the correct number of bits. For this purpose the allocation information is applied to the filter 21 over the line 22.

The receiver further comprises a deemphasis unit 23 which subjects the reconstructed digital signal supplied by the filter 21 to deemphasis. For a correct deemphasis the relevant information in the bits 24 to 31 of the first frame portion should be applied from the memory 18a to the deemphasis unit 23 over the line 24.

If the system uses scale factors in this format, the receiver will include the switch 11, the memory 12, and the multiplier 17, and the third frame portion will contain the scale factors SF j,m. Because of a control signal applied by the processing unit 18 over the line 13, the switch 11 is in the lower position at the instant at which the third frame portion FD3 of a frame arrives. Address signals are supplied to the memory 12 by the processing unit 18 over the line 14. The scale factors are then stored in the memory 12, which has 64 locations for the storage of the 64 scale factors. If a B-format frame is being received, the processing unit 18 applies such address signals to the memory 12 that only the scale factors for the subbands 1 to 16 are overwritten by the scale factors in the B-format frame. Subsequently, as a result of another control signal applied over the line 13, the switch 11 is changed to the upper position shown in the drawing, so that the samples are applied to the multiplier 17. Using the allocation information, which is now applied to the multiplier 17 over the line 22, the multiplier first derives the individual samples of the correct bit length from the serial data stream applied over the line 16.

The samples are then multiplied so as to restore them to the correct values which the original samples had prior to scaling down in the transmitter. If the scale factors stored in the memory 12 are the scale factor values by which the samples have been scaled down in the transmitter, these values should first be inverted (one divided by the value) before application to the multiplier 17. Obviously, it is also possible to invert the scale factors upon reception before they are stored in the memory 12. If the scale factors in the frames are already equal to the value by which the samples should be scaled up during reception they can be stored directly in the memory 12, and can then be applied directly to the multiplier 17.

It is evident that no memory is required to store all these samples before the signal processing performed upon the samples contained in the frame begins. At the instant at which a sample arrives over the line 16 all the information required for processing this sample is already available, so that processing can be carried out immediately. This entire process is controlled and synchronized by control signals and clock signals applied to all the parts of the transmitter by the processing unit 18.

Not all the control signals are shown. This is not necessary because the details of operation of the receiver will be obvious to those skilled in the art. Under control of the processing unit 18 the multiplier 17 multiplies the samples by the appropriate multiplication factors. The samples, which have now been restored to the correct amplitude, are applied to the reconstruction filter 18 in which the subband signals are reconverted to form the wide-band digital signal. Further description of the receiver is not necessary because such receivers are generally known, for example as described in the Thiele et al article cited above. Moreover, it will be evident that if the system information is also transmitted the receiver can be highly flexible and can correctly decode the signals even if the second digital signals contain different system information.

Other embodiments

FIG. 13 shows diagrammatically another embodiment of the transmitter, in the form of a recording device for recording the wide-band digital signal on a record carrier such as a magnetic record carrier 25. The encoder 6 supplies the second digital signal to a recording device 27 comprising a write head 26 by means of which the signal is recorded in a track on the record carrier. It is then possible to record the second digital signal in a single track on the record carrier, for example by means of a helical-scan recorder. In this case the single track can be divided into juxtaposed tracks which are inclined relative to the longitudinal direction of the record carrier. An example of this is an RDAT-like recording method. Another method is to split the information and simultaneously recording the split information in a plurality of juxtaposed tracks which extend on the record carrier in the longitudinal direction of the record carrier. For this the use of an SDAT-like recording method may be considered. A comprehensive description of the two above methods can be found in the aforementioned book "The art of a digital audio" by J. Watkinson.

Again it is to be noted that the signal supplied by the unit 6 may be first be encoded in a signal converter. This encoding may, for example, be an 8-to-10 conversion followed by an interleaving process, as described with reference to FIG. 4. If the encoded information is recorded on the record carrier in a plurality of adjacent parallel track, the signal converter should also be capable of assigning the encoded information to the various tracks.

FIG. 14 shows diagrammatically an embodiment of the receiver 5, which may be used in conjunction with the transmitter of FIG. 13; the two may form one apparatus which then provides transmission over time instead of distance. The receiver shown is a player or read device for reading the record carrier 25 on which the wide-band digital signal has been recorded by means of the device shown in FIG. 13, in the form of the second digital signal described above. The second digital signal is read from a track on the record carrier by the read head 29 and is applied to the receiver 5, which may be for example of a construction as shown in FIG. 12. Again the read device 28 may be constructed to carry out an RDAT-like or an SDAT-like reproducing method. Both methods are again described comprehensively in the aforementioned book by Watkinson.

If the signal supplied by the unit 6 in the recording device shown in FIG. 13 has been converted, for example in an 8-to-10 conversion and in an interleaving step, the encoded signal read from the record carrier 25 should first be de-interleaved and should be subjected to 10-to-8 conversion. Moreover, if the encoded signal has been recorded in a plurality of parallel tracks the reproducing unit shown in FIG. 14 should arrange the information read from these tracks in the correct sequence before further processing is applied.

FIGS. 15a–d show a number of other possibilities of inserting the scale factors and the samples in the third frame portion FD3 of a frame. FIG. 15a illustrates the above described method in which the scale factors SF for all the subbands m and channels (I or II) are inserted in the third frame portion before the samples. FIG. 15b illustrates the same situation as FIG. 15a, but in this case it diagrammatically represents the storage capacity for the scale factors SF I,m and SF II,m and the associated x samples for these two channels in the subband m. FIG. 15b shows the samples for the two channels in the subband m combined to blocks, whereas normally they are distributed within the third frame portion. The samples have a length of y bits. In the above example x is 12 and y is now taken to be 8.

Stereo coding

FIG. 15c shows another format. The two scale factors for the first and the second channel in the subband are still present in the third frame portion. However, instead of the x samples for both channels (the left and right channels for a stereo signal) in the subband m (i.e. 2× samples in total) only x samples for the subband m are included in the third frame portion. These x samples are obtained, for example, by adding corresponding samples in each of the two channels to one another. Thus a monophonic signal is generated and transmitted for this subband m.

The x samples in FIG. 15c each have a length of z bits. If z is equal to y this saves room in the third frame portion, which can be used for samples requiring a more accurate quantization. It is alternatively possible to express the x samples of the mono signal in Z=2y (=16) bits. Such a signal processing is applied if the phase difference between the left-hand and the right-hand signal component in a subband is irrelevant but the waveform of the monophonic signal is important. This applies in particular to signals in higher subbands because the phase-sensitivity of the ear for the frequency in these subbands is smaller. By expressing the x samples of the mono signal in 16 bits the waveform is quantized more accurately, while the room occupied by these samples in the third frame portion is equal to that in the example illustrated in FIG. 15b.

Yet another possibility is to represent the samples by an intermediate number of bits, for example 12 bits. The signal definition is then more accurate than in the example illustrated in FIG. 15b, while at the same time room is saved in the third frame portion so that the bits saved can be allocated where the need is greater.

When the signals included in the third frame portion as illustrated in FIG. 15c are reproduced at the receiving end, a stereo effect is obtained which is referred to as "intensity stereo". Here, only the intensities of the left-channel and the right-channel signals (in the subband m) can differ because of a different value for the scale factors SF I,m and SF II,m. Thus different kinds of information relating to the stereo nature of the audio signal can be represented by the composite signals and other signals which are transmitted.

FIG. 15d shows still another possibility. In this case there is only one scale factor SFm for both signal components in the subband m. This is a situation which is particularly apt to occur in low-frequency subbands.

Yet another possibility, which is not shown, is that the x samples for the channels I and II of the subband m, as in FIG. 15b, do not have associated scale factors SF I,m and SF II,m. Consequently, these scale factors are not inserted in the same third frame portion. In this case the scale factors SF I,m and SF II,m included in the third frame portion of a preceding frame must be used for scaling up the samples in the receiver.

All the possibilities described with reference to FIGS. 15a–d can be employed in the transmitter in order to achieve a most efficient data transfer over the transmission medium. Thus, frames as described with reference to different ones of FIGS. 15a–d may occur alternately in the data stream. It will be appreciated that, if the receiver is to be capable of correctly decoding these different frames, information about the structure of these frames must be included somewhere, such as in the system information.

The transmitter

Figure 16:
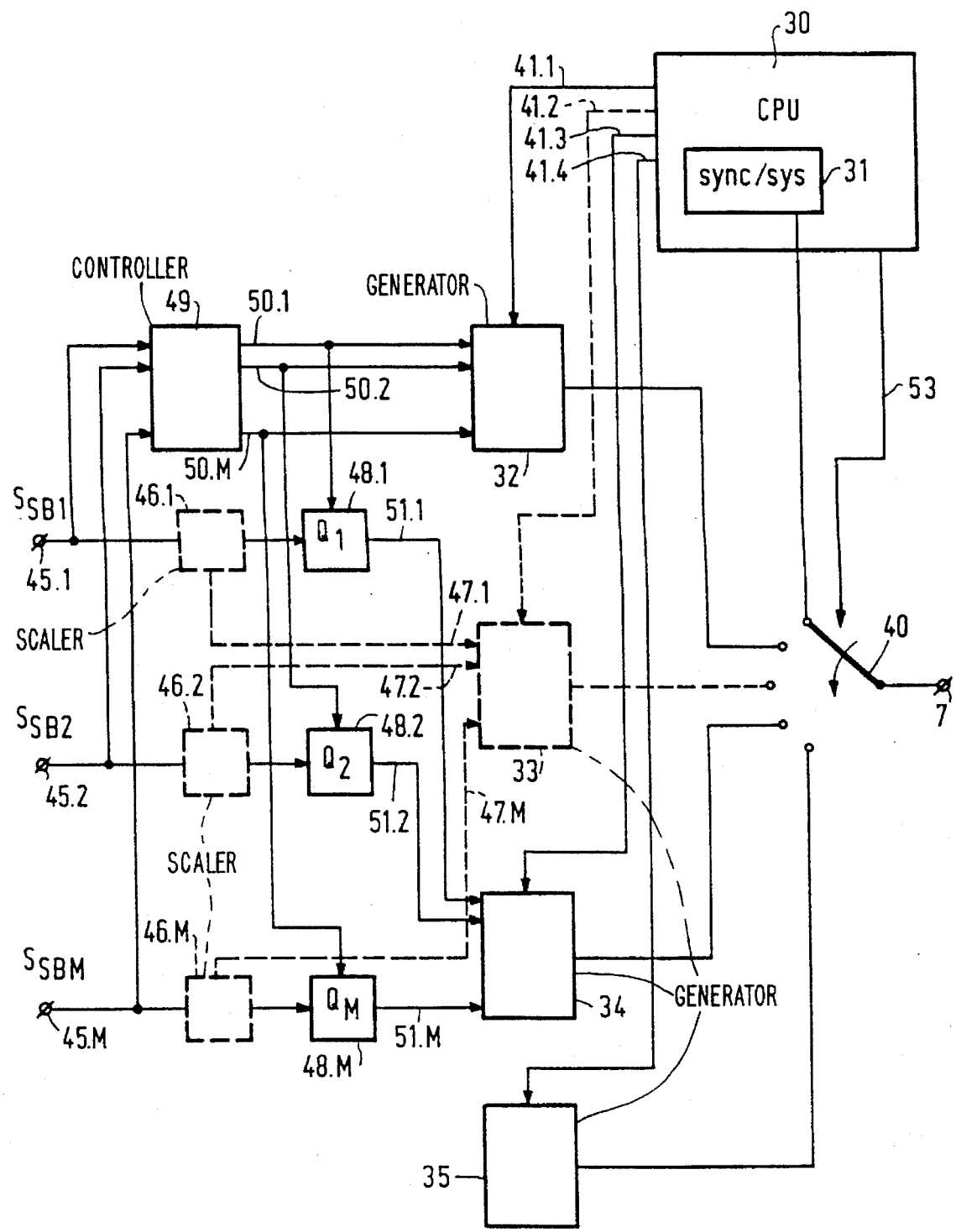
FIG. 16 is a block diagram of one preferred transmitter arrangement.

FIG. 16 shows the transmitter in more detail, particularly with respect to combination of the various items of information to form the serial data stream shown in FIGS. 1, 2 and 3. FIG. 16 in fact shows a more detailed version of the encoder 6 in the transmitter 1. The encoder has a central processing unit 30, which controls a number of the encoder circuits; and also includes a generator 31 for generating the synchronising information and the system information described with reference to FIG. 3, a generator 32 for supplying allocation information, a generator 33 (optional) for supplying the scale factors, a generator 34 for supplying the samples for a frame, and a generator 35 for generating the additional information packet IP P'+1.

The outputs of these generators are coupled to associated inputs of a multiplexer 40 shown as a five-position switch whose output is coupled to the output 7 of the encoder 6. The CPU 30 controls the multiplexer or switch 40 over the line 53, and the various generators over the lines 41.1 to 41.4.

The operation of the transmitter will be described for a mono signal divided into M subband signals. These M subband signals $S_{SB1}$ to $S_{SBM}$ are applied to the encoder input terminals 45.1, 45.2, . . . , 45.M. If scale factors are to be used, blocks of samples of each of the subband signals are processed together in the optional subband scaling units 46.1 to 46.M. A number, for example twelve, of samples in a block are scaled to the amplitude of the largest sample in the block. The M scale factors are supplied to the unit 33 (if present) over the lines 47.1 to 47.M. The subband signals are supplied both to an allocation control unit 49 and (scaled if that option is in use) to M quantisers 48.1 to 48.M. For every subband the allocation control unit 49 defines the number of bits with which the relevant subband signal should be quantized. This allocation information is applied to the respective quantisers 48.1 to 48.M over the lines 50.1 to 50.M, so that these quantisers correctly quantise the 12 samples of each of the subband signals; and is also supplied to the generator 32. The quantized samples of the subband signals are supplied to the generator 34 over the lines 51.1 to 51.M. The generators 32, 33 and 34 arrange the allocation information, the scale factors and the samples in the correct sequence described above.

In the position of the multiplexer or switch 40 shown, the synchronising and system information associated with the frame to be generated is supplied by the generator 31 in the CPU 30 and fed to the encoder output 7. Subsequently, the multiplexer or switch 40 responds to a control signal supplied by the CPU 30 over the line 53, and is set to the second position from the top so that the output of the generator 32 is coupled to the output 7. The sequence of allocation information as described with reference to FIG. 10 or 11 is the supplied. After this the switch 40 is set to the third position from the top, coupling the output of the generator 33 to the output 7, and the generator 33 now supplies the scale factors in the correct sequence. The switch 40 is then set to the next position, so that the output of the generator 34 is coupled to the output 7, and the generator 34 supplies the samples in the various subbands in the correct sequence. In this cycle exactly one frame is applied to the output 7. Subsequently, the switch 40 is reset to the top position. A new cycle is then started, in which a subsequent block of 12 samples for each subband is encoded and a subsequent frame can be generated on the output 7.

In some cases, for example if the sample frequency $F_s$ is 44.1 kHz (see FIG. 5) an additional information packet (the dummy slot, see FIG. 2) must be added. In that case, after the generator 34 has finished supplying the samples, the multiplexer or switch 40 will be set to the bottom position. The output of the generator 35 is now coupled to the output 7, and the generator 35 generates the additional information packet IP P'+1. After this the switch 40 is reset to the top position to start the next cycle.

It will be clear that, if the signal received by the transmitter is to be corrected for errors caused during transmission of the signal, an appropriate error coding and/or interleaving should be applied to the second digital signal. In addition, prior to transmission some modulation is usually required. Thus, the digital signal transmitted through the transmission medium may not be directly identifiable as the second signal, but will be a signal which has been derived therefrom.

It will to be noted that, for example in the case that the subbands have different widths, the number of samples for the various subbands inserted in one third frame portion may differ and are likely to differ. If it is assumed, for example, that a division into three subbands is used, including a lower subband $SB_1$, a central subband $SB_2$ and an upper subband $SB_3$, the upper subband may have a bandwidth which is, for example, twice as large as that of the other two subbands. This means that the number of samples inserted in the third frame portion for the subband $SB_3$ is probably also twice as large as for each of the other subbands. The sequence in which the samples are applied to the reconstruction filter in the receiver may then be: the first sample of $SB_1$, the first sample of $SB_3$, the first sample of $SB_2$, the second sample of $SB_3$, the second sample of $SB_3$, the third sample of $SB_3$, the second sample of $SB_2$, the fourth sample of $SB_3$, . . . etc. The sequence in which the allocation information for these subbands is then inserted in the second frame portion will then be: first the allocation word for $SB_1$, then the allocation word of $SB_3$, and subsequently the allocation word for $SB_2$. The same applies to the scale factors. Moreover, the receiver can derive, from the transmitted system information, that in this case the cycle comprises groups of four samples each, each group comprising one sample of $SB_1$, one sample of $SB_3$, one sample of $SB_2$ and subsequently another sample of $SB_3$.

Other Frame Arrangements

Figures 17, 18:
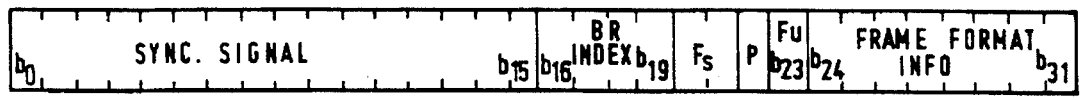
FIG. 17 is a diagram of another structure for the first portion of a frame.
FIG. 18 is a table showing system information included in the structure of FIG. 17.

FIG. 17 shows another structure of the first frame portion FD1. Again the first frame portion FD1 contains exactly 32 bits and therefore corresponds to one information packet. The first 16 bits again constitute the synchronising signal (or synchronization word). The synchronization word may also be the same as the synchronization word of the first frame portion FD1 in FIG. 3, but the information accommodated in bits 16 through 31 differs from the information in bits 16 through 31 in FIG. 3. The bits $b_{16}$ through $b_{19}$ represent a 4-bit bit rate index (BR index) number whose meaning is illustrated in the Table in FIG. 18. If the bit rate index is equal to the 4-bit digital number '0000' this denotes the free-format condition, which means that the bit rate is not specified and that the decoder has to depend upon the synchronization word alone to detect the beginning of a new frame. The 4-bit digital number '0000' is not employed in order not to disturb the synchronization word detection. In the second column of the table of FIG. 18 the bit rate index is represented as a decimal number corresponding to the 4-bit digital number. The corresponding bit rate values are given in column 1.

With this format the first frame portion contains information related to the number of information packets in the frame. As shown in FIG. 18, the sample frequency $F_s$ is defined by one of the four possible 2-bit digital numbers for the bits $b_{20}$ and $b_{21}$ having the values listed. Bit 22 indicates whether the frame comprises a dummy slot, in which case $b_{22}$='1', or does not comprise a dummy slot, in which case $b_{22}$='0'. Along with other predetermined information, then, the information in the bits $b_{16}$ through $b_{22}$ makes it possible to determine how many information packets are actually present in the frame.

From the number of samples of the wide-band signal whose corresponding information belonging to the second digital signal is accommodated in one frame, in the present example $n_s$ =384, it is possible to determine how many information packets B are present in the frame by means of the data in the Table in FIG. 8, the padding bit $b_{22}$ and the formula $$P = \frac{BR}{N} \times \frac{n_s}{F_s}.$$

The bit $b_{23}$ is intended for specifying a future extension of the system. This future extension will be described hereinafter. For the time being this bit is assumed to be '0'.

Indicator Signals

Various indicator and control signals are provided by the bits $b_{24}$ through $b_{31}$, which will be described with reference to FIGS. 19 and 20. The bits $b_{24}$ and $b_{25}$ give the mode indication for the audio signal. For the four possibilities of this two-bit digital number FIG. 20 shows whether the wide-band digital signal is a stereo audio signal ('00'), a mono signal ('11'), a bilingual signal ('10'), or an intensity stereo audio signal ('01'). In the last-mentioned case the bits 26 and 27 indicate which subbands have been processed in accordance with the intensity stereo method. In this example the respective two-bit numbers '00', '01', '10', and '11' mean, respectively, that the subbands 5-32, 9-32, 13-32 and 17-32 have been processed in accordance with the intensity stereo method. As stated hereinbefore intensity stereo can be applied to the higher subbands because the ear is less phase-sensitive for the frequencies in these subbands. The bit $b_{28}$ can be used as a copyright bit. If this bit is '1' this means that the information is copy-protected and should/cannot be copied. The bit $b_{29}$ can indicate that the information is original information ($b_{29}$='1'), for example in the case of the prerecorded tapes, or information which has been copied ($b_{29}$='0'). The bits $b_{30}$ and $b_{31}$ specify the emphasis which may have been applied to the wide-band signal in the transmitter, for example as described with reference to FIG. 7.

Various configurations of the second frame portion FD2 may be described by the various mode indications represented by the bits $b_{24}$ through $b_{27}$ in the first frame portion. The second frame portion comprises the 4-bit allocation words whose meaning has been described with reference to FIG. 9. For the stereo mode ($b_{24}$, $b_{25}$=00) and the bilingual mode ($b_{24}$, $b_{25}$=10) the second frame portion FD2 again has a length of 8 information packets (slots) and is composed as described with reference to FIG. 10. In the stereo mode 'l' in FIG. 10 then represents, for example, the left-channel component and 'll' the right channel component. For the bilingual mode 'l' denotes one language and 'll' denotes the other language. For the mono mode ($b_{24}$, $b_{25}$=11) the length of the second frame portion FD2 is of course only 4 information packets (slots).

FIG. 21 illustrates the sequence of the allocation words for the various subbands 1 through 32 in the four information packets (slots) 2 through 5. Thus, every quantity M-i represents a four-bit allocation word which specifies the number of bits in every sample in the subband of the sequence number i, i ranging from 1 to 32. In the intensity stereo mode ($b_{24}$, $b_{25}$=01) there are gfour possibilities indicated by means of the bits $b_{26}$ and $b_{27}$, see FIG. 20. All these possibilities result in a different content of the second frame portion FD2.

FIGS. 22a to 22d illustrate the four different contents of the second frame portion. If the switch bits $b_{26}$, $b_{27}$ are '00' the signals in the subbands 1 through 4 are normal stereo signals and the signals in the subbands 5 through 32 are intensity-stereo signals. This means that for the subbands 1 through 4 for the left-hand and right-hand channel components in these subbands the associated allocation words should be stored in the second frame portion. In FIG. 22a this is represented by the consecutive allocation words AW (I, 1); AW (R, 1); AW (I, 2); AW (R, 2); ... AW (R, 4), stored in the slot 2 of the frame, i.e. the first slot of the second frame portion. FIG. 22a only gives the indices (i-j) of the allocation words, i being equal to L or R and indicating the left-hand and the right-hand channel component respectively, and j ranging from 1 through 4 and representing the sequence number of the subband. For the subbands 5 through 32 the left-hand and the right-hand channel components contain the same series of samples. The only difference resides in the scale factors for the left-hand and the right-hand channel components in a subband. Consequently, such a subband requires only one allocation word. The allocation words AW (i, j) for these subbands 5 through 32 are indicated by the indices M-j, where i is consequently equal to M for all the subbands and where j ranges from 5 through 32.

FIG. 22a shows that 4½ information packets are required for inserting the 36 allocation words in the second frame portion. If the switch bits $b_{26}$, $b_{27}$ are '01', the signals in the subbands 1 through 8 will be normal stereo signals and the signals in the subbands 9 through 32 will be intensity-stereo signals. This means that for each of the subbands 1 through 8 two allocation words AW(L, j) and AW(R,j) are required and that for each of the subbands 9 through 32 only one allocation word AW(M,j) is required. This implies that in total 40 allocation words are needed, included in five information packets (slots), i.e. IP2 through IP6, of the frame. This is illustrated in FIG. 22b. In this case the second frame portion FD2 has a length of five information packets (slots).

If the switch bits $b_{26}$, $b_{27}$ are '10' the signals in the subbands 1 through 12 will be normal stereo signals and the signals in the subbands 13 through 32 will be intensity-stereo signals. FIG. 22c gives the structure of the second frame portion FD2 with the allocation words for the various subbands. The second frame portion now has a length of 5½ information packets (slots) in order to accommodate all the allocation words. If the switch bits $b_{26}$, $b_{27}$ are '11' the signals in the subbands 1 through 16 will be normal stereo signals and the signals in the subbands 17 through 32 will be intensity-stereo signals. Now 48 allocation words are needed, which are inserted in the second frame portion, which then has a length of 6 information packets (slots), see FIG. 22d.

What has been stated above about the scale factors is also valid here. When it is assumed that an allocation word 0000 has been assigned neither to any of the subbands nor to any of the channels, 64 scale factors are required both for the stereo mode and for the intensity-stereo modes. This is because in all the intensity-stereo modes every mono subband should have two scale factors to enable intensity-stereo to be realised for the left-hand and the right-hand channel in this subband (see FIG. 15c). It is obvious that in the mono mode the number of scale factors is halved, i.e. 32, again assuming that the allocation word 0000 has not been assigned to any of the subbands.

Scale Factor Determination

Figure 24:
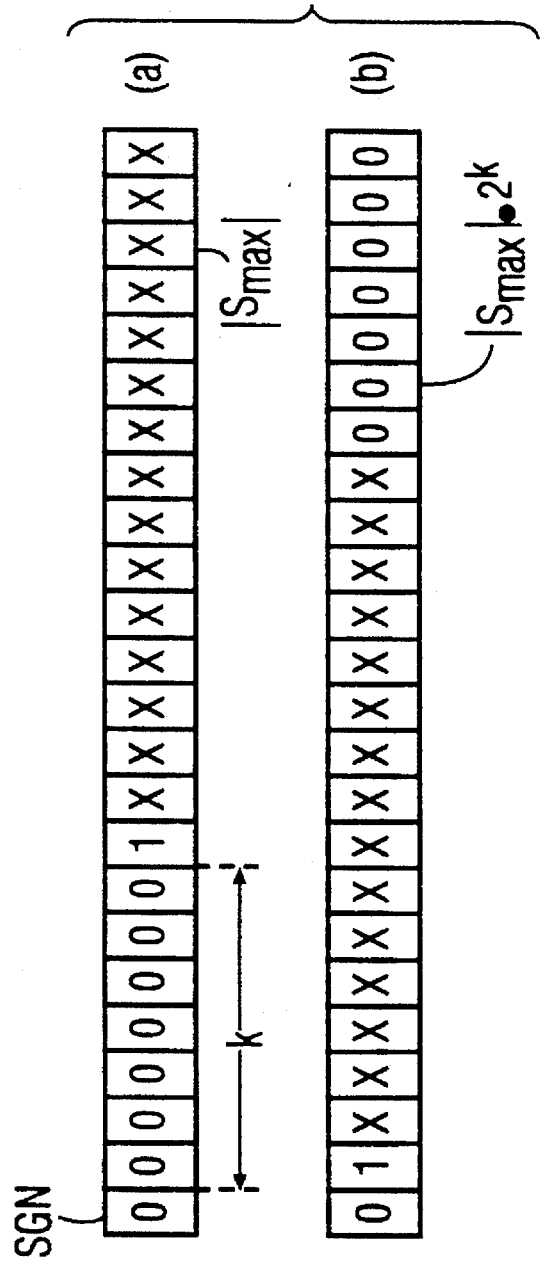
FIGS. 24 is a binary number diagram relating the sample with largest absolute value to an intermediate value used for scale factor computations.

A method of determining the 6-bit scale factors will now be explained below. As stated hereinbefore, the sample having the largest absolute value is determined for every 12 samples of a subband channel. Line (a) of FIG. 24 shows the binary representation of a maximal sample $|S_{max}|$. The first value of $S_{max}$. The samples are represented in two's complement notation. bit, designated SGN, is the sign bit and is '0' because it relates to the absolute The sample comprises k 'zeros' followed by a "1". The values of the other bits of the 24-bit digital number are not relevant and can be either '0' or '1'.

$|S_{max}|$ is now multiplied by $2^k$ to produce the number shown in line (b) of FIG. 24. Subsequently $|S_{max}|\cdot 2^k$ is compared with a digital number $DV_1$ equal to 010100001100000000000000 and a digital number $DV_2$ equal to 011001100000000000000000. If $|S_{max}|\cdot 2^k < DV_1$ a specific constant p is taken to be 2. If $DV_1 \leq |S_{max}|\cdot 2^k < DV_2$, then p is taken to be 1. If $|S_{max}|\cdot 2^k \geq DV_2$, then p=0. The number k is limited to $0 \leq k \leq 20$. The scale factor is now determined by the numbers k and p in accordance with the following formula.

$$SF=3k+p.$$

Consequently, the maximum value for SF is 62. This means that the scale factors can be represented by 6-bit numbers, the six-bit number 111111 (which corresponds to the decimal number 63) not being used. In fact, the 6-bit binary numbers are not the scale factors but they are in a uniquely defined relationship with the actual scale factors, as will be set forth below. All the 12 samples S are now multiplied by a number which is related to the values for k and p. The 12 samples are each multiplied as follows:

$$S'=Sx2^k xg(p)$$

where the number g(p) has the following relation with p:

$g(p)=1$ for $p=0$ $g(p)=1+2^{-2}+2^{-8}\ 2^{-10}+2^{-16}+2^{-18}+2^{-23}$ for $p=1$ $g(p)=1+2^{-1}+2^{-4}+2^{-6}+2^{-8}+2^{-9}+2^{-10}+2^{-13}+2^{-15}+2^{-16}2^{-17}+2^{-19}+2^{-20}$ for $p=2$.

The parameter k specifies the number of 6 dB steps and the factors (g(1) and g(2) are the closest approximations to steps of 2 dB. The samples S' thus scaled are now quantized to enable them to be represented by q-bit digital numbers in two's complement notation. In FIG. 25 this is illustrated for q=3. The scaled samples S' have values between +1 and −1, see FIG. 25a. In the quantiser these samples must be represented by q bits, q corresponding to the allocation value for the relevant subband (channel). Since, as stated above, the q-bit digital number comprising only 'ones' is not used to represent a sample the total interval from −1 to +1 should be divided over $2^{q-1}$ smaller intervals. For this purpose the scaled samples S' are transformed into the samples S" in accordance with the formula $S''=S'(1-2^{-q})-2^{-q}$.

The samples S" are subsequently truncated at q bits, see FIG. 25c. Since the '111' representation is not permissible the sign bits are inverted, see FIG. 25d. The q(=3)-bit numbers given in FIG. 25d are now inserted in the third frame portion FD3, see FIG. 2.

Samples S' which comply with −0.71≦S'≦−0.14 are represented by the digital number '001'. This proceeds similarly for samples S' of larger values up to samples which comply with 0.71≦S'≦1 and which are represented by the digital number "110'. Consequently, the digital number '111' is not used.

Dequantization at the receiving side is effected in a manner inverse to the quantization at the transmission side, see FIG. 26. This means that first the sign bits of the q-bit digital numbers are inverted to obtain the normal two's complement notation, see FIG. 26b.

Subsequently the samples S' are derived from the transformed samples S' by means of the formula $$S'=(S''+2^{-q+1})(1+2^{-q}+2^{-2q}+2^{-3q}+2^{-4q}+\ldots)$$

(ee FIGS. 26c and 26d). The values S' thus obtained are now situated exactly within the original intervals in FIG. 25a. At the receiving side the samples S' are subsequently scaled to the original amplitudes by means of the transmitted information k, p which is related to the scale factors. Thus, at the receiving side a number g'(p) complies with:

$g'(p)=1$ for $p=0$ $g'(p)=2^{-1}+2^{-2}+2^{-5}+2^{-6}$ for $p=1$ $g'(p)=2^{-1}+2^{-3}+2^{-8}+2^{-9}$ for $p=2$.

Scaling to the original amplitudes is now effected using the following formula:

$$S=S'\cdot 2^{-k}\cdot g'(p).$$

In the two possible versions of a frame as described with reference to FIGS. 2 and 3 and FIGS. 2, 17 and 19 respectively the third frame portion may not be filled entirely with information. This will occur more often and sooner as the algorithms for subband coding, i.e. the entire process of dividing the signal into subband signals and the subsequent quantization of the samples in the various subbands, are improved. In particular, this will enable the information to be transmitted with a smaller number of bits (average number per sample). The unused part of the third frame portion can then be utilized for transmitting additional information. In the first frame portion FD1 in FIG. 17 allowance has been made for this by means of the "future-use" bit $b_{23}$. Normally, this bit is '0', as will be apparent from FIG. 18.

Additional Signal

Figure 23:
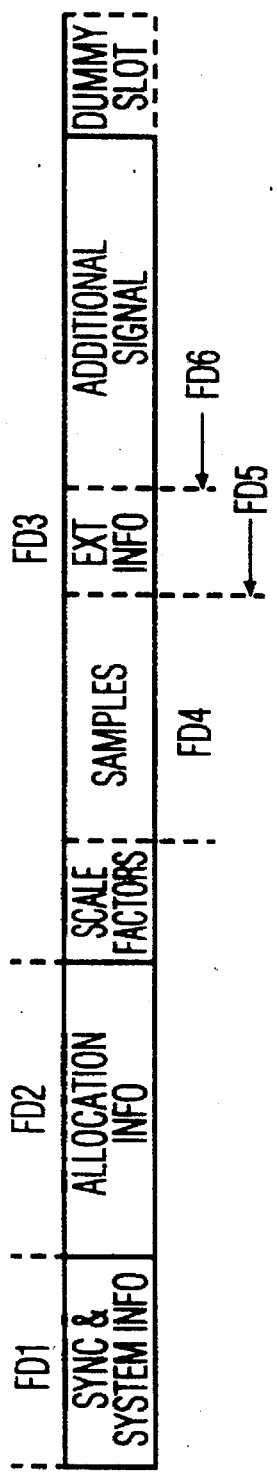
FIG. 23 is a diagram of a frame structure including an additional signal.

If an additional signal has been inserted in the third frame portion FD3 of a frame, the future-use bit $b_{23}$ in the first frame portion FD1, see FIG. 17, will be '1'. During reading of the first frame portion FD1 this makes it possible for the receiver to detect whether the frame contains additional information. The allocation information and the scale factors, see FIG. 23, inform the receiver that only the part of the third frame portion FD3, marked FD4 in FIG. 23, contains quantized samples of the subband signals. The remainder, marked FD5 in FIG. 23, now contains the additional information. The first bits in this frame portion FD5 are designated 'EXT INFO' or extension information. These bits indicate the type of additional information. The additional information may be, for example, an additional audio channel, for example for the transmission of a second stereo channel. Another possibility is to use these two additional audio channels to realize 'surround sound' together with the audio subband signals in the frame portion FD4. In that case the front-rear information required for surround sound may be included in the frame portion FD5. In the part marked FD6 the frame portion FD5 may again contain allocation information, scale factors and samples (in this order) and the sequence of the allocation words and the scale factors may then be similar to the sequence as described with reference to FIGS. 2 and 3 and FIGS. 2, 17 and 19.

In the case of 'surround sound' simple receivers may merely decode the stereo audio information in the frame portions FD2 and FD3, except for the frame portion FD5. More sophisticated receivers are then capable of reproducing the surround-sound information and for this purpose they also employ the information in the frame portion FD5.

The extension-info bits may also indicate that the information in the frame portion FD6 relates to text, for example in the form of ASCII characters. It may even be considered to insert video or picture information in the frame portion FD6, this information again being characterized by the extension-info bits.

It is to be noted that the invention is not limited to the embodiments shown herein. The invention also relates to those embodiments which differ from the embodiments shown herein with respect to features which are not relevant to the invention as defined in the Claims.

What is claimed is:

1. An encoder for encoding a plurality of input signals, comprising steering means responsive to said plurality of input signals for generating at least one individual signal and a composite signal, said composite signal having a frequency spectrum in one frequency band, and said at least one individual signal having at least one respective frequency spectrum in a plurality of frequency bands excluding said one frequency band, said plurality of frequency bands respectively representing a corresponding one of said plurality of input signals within the plurality of frequency bands, and control means responsive to said steering means for generating a steering control signal having at least one component relating to said frequency band of said composite signal.

2. An encoder as claimed in claim 1, wherein bandwidths of said frequency bands are respectively approximately equal to the bandwidths of the critical bands of the human ear.

3. An encoder as claimed in claim 1, wherein said plurality of input signals represent input channels, and the steering control signal includes a control signal which represents a ratio of levels between the signals representing the channels, corresponding to the composite signal.

4. An encoder for encoding a plurality of input signals, comprising steering means responsive to said plurality of input signals for generating at least one individual signal and a composite signal, said at least one individual signal having at least one respective individual frequency spectrum in a first plurality of frequency bands respectively representing a corresponding one of said plurality of input signals within the first plurality of frequency bands, and said composite signal having a frequency spectrum in a respective second plurality of frequency bands excluding said first plurality of frequency bands, and control means responsive to said steering means for generating a steering control signal having a plurality of components relating to the second plurality of frequency bands of said composite signal.

5. An encoder as claimed in claim 4, wherein bandwidths of said frequency bands are respectively approximately equal to the bandwidths of the critical bands of the human ear.

6. An encoder as claimed in claim 4, wherein said plurality of input signals represent input channels, and the steering control signal includes a control signal which represents a ratio of levels between the signals representing selected ones of the channels, in said second plurality of frequency bands of said composite signal.

* * * * *